Aug. 13, 1957 M. TIERMAN ET AL 2,802,896

ENCASED ELECTRIC CIRCUIT COMPONENT

Filed Nov. 13, 1952

INVENTORS
MELVIN TIERMAN
STANLEY O. DORST
BY
Connolly and Hartz
THEIR ATTORNEYS

United States Patent Office 2,802,896

Patented Aug. 13, 1957

2,802,896

ENCASED ELECTRIC CIRCUIT COMPONENT

Melvin Tierman and Stanley O. Dorst, North Adams, Mass., assignors to Sprague Electric Company, North Adams, Mass., a corporation of Massachusetts Application November 13, 1952, Serial No. 320,291

3 Claims. (Cl. 174—50.62)

This invention relates to electric circuit components such as resistors and the like, which are enveloped in casings.

Casings are used about electric circuit components to protect them against deleterious influences, particularly moisture in the ambient air. However, casings are not very effective protection unless they are sufficiently impervious to the penetration of moisture. Inasmuch as the most extensively used types of electric circuit components have one or more outwardly extending leads by which they are connected in the desired circuit, the sealing of these leads against the casing must be at least as effective a barrier as the remainder of the casing. Such effectiveness has previously been very difficult to obtain.

By way of example, it has been noted that in encased wire-wound resistors the resistance wire which is generally welded to a terminal band, is subjected to corrosion at the weld and finally fails at that point. Furthermore, the resistance of the unit changes by reason of surface oxidation which reduces the cross sectional current-carrying area of the wire, or by corrosion products which bridge across turns of the wire and shunt out some of the resistance.

Among the objects of the present invention is the provision of a simple form of encased electric circuit component which avoids the above and related disadvantages.

This, as well as additional advantages of the present invention, will be more clearly understood from the following description of several of its exemplifications, reference being made to the accompanying drawings wherein.

According to the present invention, an electric circuit component having at least one outwardly extending lead for connection in an electric circuit has a moisture impervious casing, the lead projecting out from the casing, and a seal connecting the casing with the lead where it projects through, the seal being also moisture impervious and sealing the site of the lead projection by being adherently bonded in place against both the lead and the casing, at least one of said adhesions being an in situ cured organo-substituted polysiloxane resin in which the organo groups are connected by carbon-to-silicon bonds. Such resins are commonly called "silicones."

A metal barrier makes one of the best moisture seals known in the art. Soldered connections for a sheet metal barrier make a very convenient and highly effective technique for assuring the continuity of the metal casing. Unfortunately, such a technique is not suitable for sealing the site of a projecting lead against a casing, inasmuch as at least one lead is generally required to be electrically insulated from such a casing.

However, the silicone resin seals of the present invention have been found to be moisture barriers that are at least as effective as metal so that it now becomes possible to give better sealing than anything heretofore used.

Figure 1:
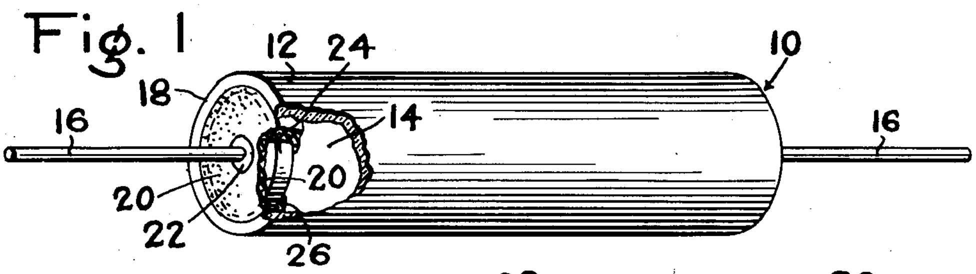
Fig. 1 is a perspective view with parts broken away showing an encased electric circuit component embodying the present invention.

Turning now to the drawings, Fig. 1 illustrates an electric circuit component 10 in which the electrical unit or section is contained within a tubular casing 12. Although not illustrated in Fig. 1, the section can be of any suitable form such as a wire-wound resistance unit having a number of turns of wire held on a mandrel-like support within the space 14 in tube 12.

At one or both ends of the resistance unit, a terminal lead 16 projects through the end 18 of the casing 12. Spanning the gap between the site of the lead projection and the end 18 is an end seal shown in the form of a disc-like barrier 24 sealed to lead 16 by means of adherent layer 22, and sealed to the casing 12 by means of a second adherent layer 26.

The layers 22 and 26 can both be an in situ cured silicon resin which is securely adhered in place both to the barrier 24 as well as to the casing 12. Where either the barrier or casing are of vitreous material such as ceramic and glass, or metal, the portions of these members that are sealed against the layers 22 and 26 should have a preparatory film of silicone dimer such as is provided by the hydrolysis of an organo-halogeno-disilane, or in situ formed silicon oxide deposited as by the hydrolysis of ethyl ortho silicate. Dimethyltetrachlorodisilane is one example of a suitable disilane, although other disilanes can be used including methyl pentachlorodisilane, phenyl pentabromodisilane, 1,2-dimethyl-1,1,2,2-tetrachlorodisilane, 1,1-dimethyl-1,2,2,2-tetrachlorodisilane, etc.; trimethyltrichlorodisilane, including its various isomers, etc.; tetramethyldichlorodisilane, including its various isomers, etc.; tetraethyldichlorodisilane, triamyltrichlorodisilane, dimethyltetrabromodisilane, dimethyldiethyldichlorodisilane, diphenyltetrachlorodisilane, triphenyltrichlorodisilane, tetraphenyldichlorodisilane, ditolyltetrabromodisilane, tetra-(2-ethylphenyl)dichlorodisilane, and tetrabenzyldichlorodisilane. Best results are obtained with the disilane if it has two halogen atoms per molecule. The disilane or ortho-silicate can be dissolved in a vaporizable solvent if desired. It must be realized that when the halogen disilanes are used that hydrolysis must be conducted under conditions wherein the halogen acids are removed without contamination of the encased electrical component.

The silicone resin itself is preferably applied in a partially polymerized condition, and is advantageously in the form of a paste which is easily spread so that it can be readily applied and will fill the spacing provided for it. Plastic or elastic types of silicone resins can be used for seals, and examples of these are given in the following patents:

2,258,218 granted October 7, 1941
2,258,219 granted October 7, 1941
2,258,220 granted October 7, 1941
2,258,221 granted October 7, 1941
2,258,222 granted October 7, 1941
2,448,556 granted September 7, 1948
2,448,756 granted September 7, 1948
2,457,688 granted December 28, 1948
2,484,595 granted October 11, 1949

These polymers cure themselves somewhat better and bond more effectively when they also contain a small amount of a cure accelerator such as benzoyl peroxide or tertiary butyl perbenzoate, or any of those described in Patent No. 2,449,572.

The barrier 24 can be of any desired composition such as ceramic, polytetrafluoroethylene, mica or resin. In fact, a particularly effective form of seal uses a barrier made of a more fully cured elastic silicone resin, such as those usually identified as silicone rubbers. The bonding layer 22 can be of the same composition as layer 26. However, where barrier 24 is metal, it is within the scope of the present invention to use a soldered connection at 22 or 26 but not both.

When seal 22 is in situ cured silicone resin, the curing can be effected in the same manner and in the same operation used to effect the cure of seal 26. The lead wire 16 can be of any desired metal such as the usual tinned copper wire.

As one example of how the encased unit of the present invention is made, the resistance unit having terminals 16 affixed, is slipped into tubular casing 12, and the inside surface of casing ends 18, as well as the adjacent portions of leads 16, are painted with some dimethyltetrachlorodisilane, either concentrated or diluted with a vaporizable solvent such as acetone. The disilane is permitted to dry and hydrolyze, which it does very readily with the moisture in the ambient air. Where the air is quite dry, it may be desirable to humidify the air as by releasing steam into it, or a stream of steam or steam-laden air can be directed at the coating to be hydrolyzed.

After the vaporization and hydrolysis are completed, that is in about 5 to 10 minutes, a quantity of partially polymerized pasty silicone resin corresponding to that referred to in Patent No. 2,460,795, is smeared into the open ends of the casing. A silicone rubber disc having a central perforation is then slipped over each of the lead wires and moved into the position shown in Fig. 1, care being taken to see that the pasty partial polymer is squeezed into the layers 22, 26, as illustrated. An additional amount of the pasty partial polymer is then spread as a thin film completely across the outer surface of barrier 20.

The unit is then submitted to a curing treatment. For this purpose it is fitted between clamps that squeeze the end seals together toward each other and thereby keep them under pressure. As so clamped, the unit is subjected to the following heat treatment:

8 hours at 300° F.
12 hours at 400° F.
4 hours at 480° F.
1 hour at 525° F.

At the end of the above treatment, the unit was cooled to room temperature. This unit successfully withstood a 10 pound axial pull applied to each lead 16, and also passed the humidity tests required by the Armed Forces (Section F–17 of JAN Specifications R–26A, dated September 17, 1948). Furthermore, the end seals after several hours of operation at 275° C. showed no signs of deterioration.

Even better results are obtained when the pasty partial polymer is also used to seal disc 20 against the ends of the unit held inside casing 12. In other words, where the electric unit is a resistor having a ceramic form on which the resistance wire is wound, the partial polymer paste is advisedly arranged to also seal against the ends of such a form.

Figure 2:
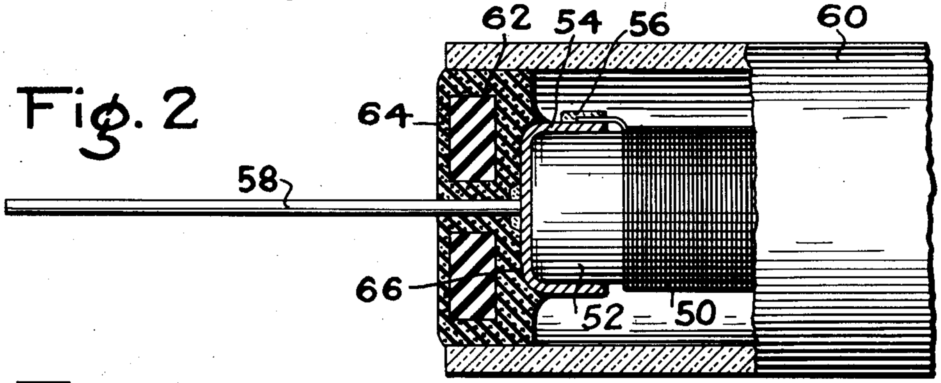
Fig. 2 is a sectional view of an encased unit similar to that of Fig. 1.

Fig. 2 shows this type of construction in which the resistance section has a number of turns of wire 50 wound around a ceramic rod 52, the end of the rod carrying a metal or metallized cap 54. One end of the resistance wire 50 is connected as shown at 56 to the cap 54. A terminal lead 58 is also connected as by welding to the end of cap 54 and projects out as illustrated.

The casing is shown at 60 with a barrier disc 62 fitted between lead 58 and the casing. At 64 is indicated a partially polymerized pasty silicone resin which fills all spaces between terminal 58 and discs 62 as well as between discs 62 and the casing. In addition, a portion of the pasty material 64 is shown at 66 as extending to and sealed against the end of cap 54. Silicone dimer coating is applied in the preparatory step but is not shown in the figures since it blends with the partially polymerized material.

As indicated above, ceramic material, glass, polytetraethylene, mica, and metal can be used in place of the silicone resin discs 24 or 62. With any of these substitutions there is no perceptible loss of imperviousness.

A feature of the present invention is that the sealed unit can be used at elevated temperatures as high as 275° C., or even higher without suffering any noticeable change. Without the thin film of partially polymerized material over the entire face of the discs 20 or 62 the unit has substantially the same imperviousness and sealing characteristics as when the film is used. However, the physical strength of the seal is somewhat lower without this film.

The sealing technique described above is suitable for all types of electric circuit components. Resistors having a carbon resistance element, capacitors, both electrolytic and non-electrolytic, and in fact any type of circuit components that are to be protected from external influences are very effectively encased in accordance with the present invention. Of particular significance are non-electrolytic capacitors that utilize polytetrafluoroethylene dielectrics, particularly those in which the polytetrafluoroethylene contains or is stratified with ceramic particles. Such capacitors are suitable for operation at temperatures of 200 to 250° C. where the end seals of the present invention are practically essential to satisfactory operation.

Electrolytic capacitors such as those using an electrolyte of an organic salt such as triethanolamine picrate dissolved in triethylene glycol, as described in copending Ross Application, Serial No. 287,316, filed May 12, 1952, now Patent No. 2,759,132, are also operable at temperatures as high as 200° C. or even higher and accordingly are suitable electric circuit components for the purposes of the present invention.

Figure 3:
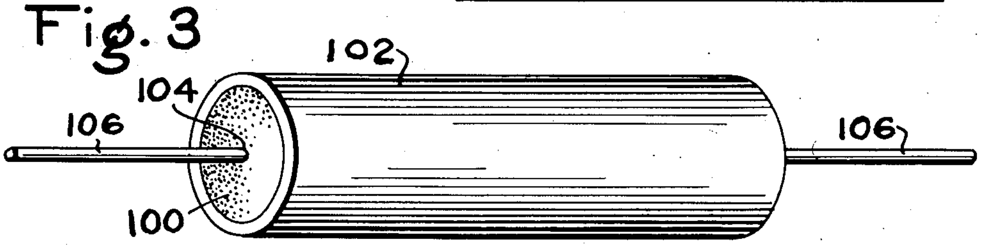
Figs. 3 and 4 are views similar to Figs. 1 and 2 showing further modified embodiments of the invention.

Fig. 3 shows an assembly similar to that of Figs. 1 and 2, except that here the end seal is shown as a continuous body 100 of partially polymerized pasty silicone resin. This body extends from the inner wall of the ends of casing 102 to site 104 where a terminal lead 106 emerges from the casing. No separate barrier disc is needed in this construction, it being only necessary to spread the paste 100 so that it fills all the space at the end seals and adheres to the end of the encased component. The pre-treatment with silicone dimer or orthosilicate can be identical to those described in connection with the construction of Fig. 1, and the final unit passes the same tests.

Figure 4:
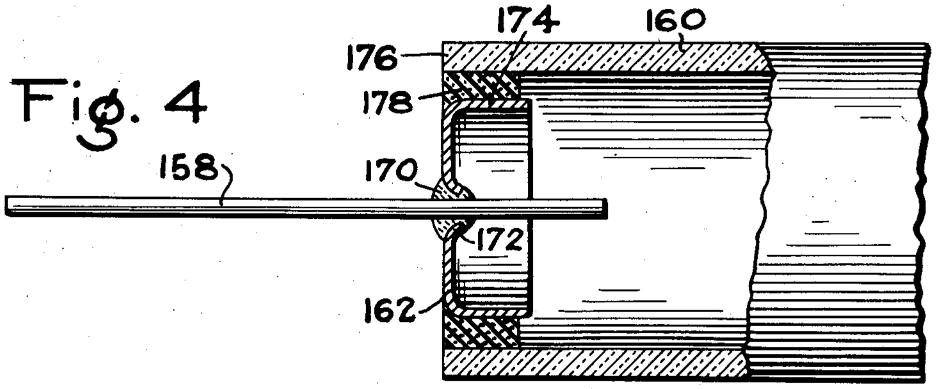

Fig. 4 shows an embodiment of the invention in which a barrier disc 162 is metal. The disc 162 is shown as sealed to lead 158 by a soldered joint 170, and may have its inner edge flanged as indicated at 172 to provide a greater surface for the solder to adhere to.

The outer edge of disc 162 can also be flanged as indicated at 174 and between the flange 174 and the end 176 of casing 160 a ring of incompletely polymerized resin paste 178 is positioned.

The construction of Fig. 4 uses somewhat less of the relatively expensive silicone resin materials, and its soldered seal 170 can be made simultaneously with the securing of the lead 158 against the terminal of the uncased electric circuit component. The encased unit is just as effectively protected as those described in connection with Figs. 1, 2 and 3.

The casings 12, 60, 102 or 160 are illustrated as ceramic. However, as indicated above they can be made of metal, in which case it is important that the end seal withstand any electrical field that may be generated between the casing and the terminal lead. Furthermore, where the barrier disc and the casing are both metal, the disc 162 can, if desired, be sealed to the end of the casing and the silicone resin seal used only between the disc and the terminal lead.

Where a silicone type seal is to be made against certain materials such as copper or cupreous surfaces, it is important that these surfaces be clean. Such cleaning has for its principal object the removal of all oxide films, and is effectively accomplished by dipping these surfaces for a short time (1 minute or less) in an aqueous solution of chromium trioxide and phosphoric acid. About one-half to ten percent chromium trioxide and twenty to sixty percent of phosphoric acid is suitable for this purpose. Other mineral acids, including hydrochloric acid, sulfuric acid, etc., can be used in place of the phosphoric acid, and other oxidizing agents such as sodium nitrite, chromates and dichromates substituted for the chromium trioxide. No pre-treatment with silicone dimer is needed when cleaned surfaces of these types are used.

As many apparently widely different embodiments of this invention may be made without departing from the spirit and scope hereof, it is to be understood that the invention is not limited to the specific embodiments hereof except as defined in the appended claims.

What is claimed is:

1. An electrical circuit component having at least one outwardly extending lead for connection in an electrical circuit, a moisture-impervious casing enveloping the circuit component, said lead projecting out from the casing and an exposed end seal substantially completely inserted within the casing and connecting the casing with the lead where it projects through, said seal being also moisture-impervious and sealing the site of the lead projection by being bonded in place against both the lead and the casing, at least one of said bonded connections being a cementing with in situ cured organo-substituted polysiloxane resin in which the organo groups are connected by carbon-to-silicon bonds and the connecting surfaces of which are primed with a cementing primer coat for the resin.

2. An electrical circuit component having at least one outwardly extending lead for connection in an electrical circuit, a moisture-impervious casing enveloping the circuit component, said lead projecting out from the casing and an exposed end seal connecting the casing with the lead where it projects through, said seal being also moisture-impervious and sealing the site of the lead projection by being held in place against both the lead and the casing, at least one of said adhesions being in situ cured organo-substituted polysiloxane resin in which the organo groups are connected by carbon-to-silicon bonds and about the periphery of which resin is an adherent film of a primer coat of organo-halo-substituted disilane also dhering to the bonded electrical component part.

3. An electrical circuit component having at least one outwardly extending lead for connection in an electrical circuit, a moisture-impervious casing enveloping the circuit component, said lead projecting out from the casing and an exposed end seal connecting the casing with the lead where it projects through, said seal being also moisture-impervious and sealing the site of the lead projection by being held in place against both the lead and the casing, at least one of said adhesions being in situ cured organo-substituted polysiloxane resin in which the organo groups are connected by carbon-to-silicon bonds and about the periphery of which resin is an adherent film of a primer coat of ethyl orthosilicate also adhering to the bonded electrical component part.

References Cited in the file of this patent

UNITED STATES PATENTS

| | | |
|---|---|---|
| 2,460,795 | Warrick | Feb. 1, 1949 |
| 2,487,057 | Kohring | Nov. 8, 1949 |
| 2,558,798 | Thom | July 3, 1951 |
| 2,559,943 | Cerny | July 10, 1951 |
| 2,617,001 | Hasley | Nov. 4, 1952 |
| 2,617,002 | Hasley | Nov. 4, 1952 |